US008533062B2

(12) United States Patent
Sauerwein

(10) Patent No.: US 8,533,062 B2
(45) Date of Patent: Sep. 10, 2013

(54) SYSTEM AND METHOD FOR OPERATING A PAWN SHOP

(75) Inventor: Kai Sauerwein, Frankfurt am Main (DE)

(73) Assignee: Gladys Ho, Frankfurt (DE)

( * ) Notice: Subject to any disclaimer, the term of this patent is extended or adjusted under 35 U.S.C. 154(b) by 145 days.

(21) Appl. No.: 13/038,925

(22) Filed: Mar. 2, 2011

(65) Prior Publication Data

US 2012/0226574 A1 Sep. 6, 2012

(51) Int. Cl.
*G06Q 30/00* (2012.01)
*G06Q 40/00* (2012.01)

(52) U.S. Cl.
USPC ................................ 705/26.3; 705/37; 705/38

(58) Field of Classification Search
USPC .................................... 705/26.3, 37, 38, 705
See application file for complete search history.

(56) References Cited

U.S. PATENT DOCUMENTS

2003/0061118 A1* 3/2003 Kocher ............................ 705/26
2003/0061119 A1* 3/2003 Kocher ............................ 705/26
2003/0061150 A1* 3/2003 Kocher ............................ 705/37
2005/0283425 A1* 12/2005 Grove et al. .................... 705/37
2006/0111999 A1* 5/2006 Spirgel et al. ................... 705/35
2008/0195527 A1* 8/2008 Barreiro et al. ................. 705/38
2009/0063323 A1* 3/2009 Caffrey et al. .................. 705/37
2009/0240616 A1* 9/2009 Hammer et al. ................ 705/37
2010/0169205 A1* 7/2010 Labuszewski et al. .......... 705/37
2010/0217702 A1* 8/2010 Tu .................................. 705/37

FOREIGN PATENT DOCUMENTS

JP 2002207890 A * 7/2002

OTHER PUBLICATIONS

Anon., "Pawn Site: Going, Going, Gone . . . Online," The Nation, Jan. 30, 2002.*

* cited by examiner

*Primary Examiner* — Nicholas D Rosen
(74) *Attorney, Agent, or Firm* — Christensen O'Connor Johnson Kindness PLLC

(57) ABSTRACT

The invention relates to a computer-implemented data processing system which comprises a database, an offering module comprising an offering user interface for a pawner to enter an indication of an item to be pawned into the database, a bidding module comprising a bidding user interface for at least one bidder to enter at least one bid into the database, a selection module for selecting one of the at least one bid as a winning bid and the bidder of the winning bid as a pawnee, a release declaration module for declaring a release of the item if the release declaration module receives a release remark, and a release notification module for notifying the pawnee that the item was released if the release declaration module declares a release of the item.

19 Claims, 9 Drawing Sheets

SYSTEM AND METHOD FOR OPERATING A PAWN SHOP

BACKGROUND

For a customer interested in borrowing money, it becomes more and more important to provide sufficient securities. While banking and other financial institutions usually address customers who are interested in borrowing a large sum of money in exchange for considerable securities like, for example, real estate, they usually do not address the interests and needs of so-called small borrowers. For these, pawn shops provide an additional source of credit. A pawn shop offers secured loans to people with items of personal property used as collateral. Pawning an item for a loan implies that the customer, or pawner, delivers the item to the pawn shop. Within a certain period of time, the pawner may purchase the item back. If the loan is not paid back within the time period or, if applicable, the time period is not extended, the pawned item will be offered for sale by the pawn shop. The pawn shop may, for example, auction off the pawned item after the time period expires.

Using the services of conventional pawn shops usually brings about the inconvenience to the customer that he has to bring or send the item to the pawn shop before the pawn shop decides to make an offer on the item. Moreover, having brought the item to the pawn shop for inspection, the pawn shop usually makes only one offer which the customer may accept or not.

SUMMARY

In a first aspect, an embodiment of the present invention provides a computer-implemented data processing system which comprises: a database, an offering module comprising an offering user interface for a pawner to enter an indication of an item to be pawned into the database, a bidding module comprising a bidding user interface for a bidder to enter at least one bid into the database, a selection module for selecting one of the at least one bid as a winning bid and the bidder of the winning bid as a pawnee, a release declaration module for declaring a release of the item if the release declaration module receives a release remark and a release notification module for notifying the pawnee that the item was released if the release declaration module declares a release of the item.

In the following, a customer who is interested in borrowing money and who delivers an item of personal property as a security will be called pawner. This term may refer to a private person as well as to a company or other type of organization. Throughout the application, the term pawner will be used for the customer before and after the item is actually delivered as a pawn.

The above system provides the pawner with a possibility to enter an indication of the item that he wishes to pawn into a database, such that it may be reviewed by at least one bidder. Using the offering user interface, the pawner may enter further details into the system like, e.g., an item description, a minimum bid, etc., as set forth in detail below. As the indication of the item in the database is available to more than one bidder, more than one bid may be entered on the item via the bidding user interface. In case a minimum bid was specified, the bidding module may check the entered bid and only allow to enter the bid in the database if the bid is higher than the minimum bid. Moreover, in some embodiments, the bidding module may check the entered bid and only allow to enter the bid in the database if the bid is higher than the bids previously entered into the database. The system according to the first aspect of the present invention, moreover, provides the opportunity for the pawner to request a release of the pawned item.

In a preferred embodiment, the system further comprises a bidding timer to determine if a predetermined bidding time has elapsed since the indication was entered into the database, wherein the bidding module only allows to enter a bid if the predetermined bidding time has not elapsed.

This allows to close the bidding on the item at a predetermined bidding time. Including a bidding time creates an auction atmosphere that may result in higher bids at the end of the bidding time. The bidding time may, in particular, be predetermined by the pawner, e.g., via the offering user interface, or may be predetermined by a trustee. Alternatively, the bidding time may be an otherwise predetermined value stored in the system.

According to a preferred embodiment, the system further comprises a release timer to determine if a predetermined release time has elapsed since the indication was entered into the database or since said at least one bid was selected as the winning bid, wherein the release declaration module only declares said release of the item if the release declaration module receives a release remark within the predetermined time.

In particular, the predetermined release time may be predetermined by the pawner, e.g., via the offering user interface, or may be predetermined by a trustee. Alternatively, the release time may be otherwise predetermined and stored in the system. Moreover, the bidding user interface may allow the bidder to enter a proposed release time which may then be received by the system and stored in the database. The release time may then be considered by the pawner when selecting said winning bid.

In a preferred embodiment, the system further comprises a non-release notification module for notifying a custodian to hand over the item to the pawnee after elapse of the release time if the release declaration module has not declared said release of the item.

Generally, the system and method of the present invention may provide for services of a trustee and a custodian. In the following, a trustee will be understood as a person, company, or organization that acts as an intermediary for transfer of payment between the pawner and the pawnee. Similarly, a custodian will be understood as a person, company, or organization that acts as an intermediary for transfer of the item. The trustee and the custodian may be an identical entity. They may, however, also be distinct entities that in some cases, may have any kind of relationship with each other. Moreover, the system may be operated by the trustee, by the custodian, or by a third party that may or may not be associated with the trustee and/or the custodian.

Some parameters of the system and method according to the present invention may be individually predetermined by the pawner or by the trustee. These encompass a potential minimum bid, the bidding time, the release time, a delivery time, the interest, a choice of whether the selection of the winning bid is manual or automatic, etc. Here, manual selection refers to the pawner selecting the winning bid via a selection user interface as described below. If the selection is manual, the bidders may be allowed to enter proposals for some parameters like, e.g., release time, delivery time, interest, etc. via the bidding user interface. The pawner may then review the proposed parameters along with the received bids and select the winning bid in consideration of the proposed parameters associated with each bid.

In a preferred embodiment, the system further comprises a bid payment module for the pawnee to transfer payment of said winning bid. This embodiment facilitates paying of said bid for the pawnee. Moreover, after completion of the transfer of payment, the system may automatically store a notice of payment in the database. This notice of payment may, in turn, be forwarded to the pawner. In particular, the bid payment module may facilitate transfer of the winning bid to the trustee.

In a preferred embodiment, the system further comprises a release payment module for the pawner to transfer a release payment. In particular, the release payment module may be for the pawner to transfer said release payment to the trustee. The release payment may include an amount equivalent to the winning bid plus interest and a release fee. The amount equivalent to the winning bid plus interest may subsequently be transferred by the trustee to the pawnee. Usually, the trustee keeps the release fee or transfers a portion of the release fee to the custodian. An interest may be predetermined by the pawner, e.g., via the offering user interface and may further be disclosed to the bidders via the bidding user interface. Alternatively, the interest may be proposed by the bidder, e.g., via the bidding user interface. This is advantageous if the winning bid is selected manually by the pawner as he may consider the proposed interest when selecting the winning bid. As a further alternative, the interest may be predetermined and entered into the system by the trustee. In this case, the system notifies the pawner and the bidders of the interest, e.g., via the offering user interface and the bidding user interface, respectively.

According to a preferred embodiment, the system further comprises a delivery module comprising a delivery user interface for a custodian to enter a delivery remark into the database if the item was delivered to the custodian. Here, the item to be pawned is delivered to the custodian. The custodian may keep the item in custody until the release time elapses or until the pawner transfers a release payment. If the pawner does not pay back the loan, the custodian may hand over the pawned item to the pawnee. For this, the pawnee may be required to pay a pawnee fee to the custodian or to the trustee. The system may further comprise a pawnee fee payment module comprising a pawnee fee user interface for the pawnee to transfer said pawnee fee to the trustee or to the custodian. If the pawner, however, transfers the release payment within the release time, the custodian may give the item back to the pawner.

According to a preferred embodiment, at least one of the user interfaces is available via the Internet. In an even more preferred embodiment, the offering and the bidding user interfaces are available via the Internet. This allows the corresponding party to cause the required transaction from his home or office. In particular, if the offering user interface is available via the Internet, the pawner may enter the indication from his computer at home. If the bidding user interface is available via the Internet, the bidders may enter their bids from a computer at home. In embodiments of the system with a delivery module as described above, the delivery user interface may, moreover, be available via the Internet. This allows the custodian to enter the delivery remark via a computer in his office. In particular, all user interfaces of the system may be available via the Internet.

In a preferred embodiment, the offering module allows the pawner to select an existing indication of an item in a goods database. In particular, in these embodiments, the system may be linked via a goods database interface to an existing goods database like that of an online store or a product catalogue provided by a manufacturer or retailer. This facilitates entering of useful information concerning the item by the pawner.

In a second aspect, an embodiment of the present invention provides a computer-implemented method comprising the following steps:

(a) receiving from a pawner an indication of an item to be pawned, (b) receiving from at least one bidder at least one bid, (c) selecting one of the at least one bid as a winning bid and the bidder of the winning bid as a pawnee, (d) notifying the pawnee to transfer payment of said winning bid to a trustee, (e) notifying the pawnee whether the item was delivered to a custodian, (f1) if a release remark is received before elapse of a predetermined release time:

(f1*a*) notifying the pawnee that the item was released, and (f1*b*) causing transfer of payment of winning bid and interest to the pawnee, (f2) if no release remark is received before elapse of the predetermined release time:

(f2*a*) notifying the pawnee that the item was not released, and (f2*b*) notifying custodian to hand over the item to the pawnee.

Here, step (f1*b*) may, in particular, comprise causing transfer of winning bid and interest from the trustee to the pawnee. This may, in particular, comprise an automatic transfer from a trustee account to a pawnee account or may comprise notifying the trustee to transfer payment to the pawnee.

In a preferred embodiment, the step of (e) notifying the pawnee whether the item was delivered to a custodian is based on the following steps:

(e1) if a delivery remark was received from the custodian within a predetermined delivery time:

notifying the pawnee that the item was delivered to the custodian, (e2) if a delivery remark was not received within said predetermined delivery time:

(e2*a*) notifying the pawnee that the item was not delivered to the custodian within the predetermined delivery time, and (e2*b*) causing retransfer of payment of said winning bid to the pawnee.

Here, step (e2*b*) may, in particular, comprise causing retransfer of payment of said winning bid from the trustee to the pawnee. This may, in particular, comprise an automatic transfer from a trustee account to a pawnee account and/or may comprise notifying the trustee to retransfer of payment of said winning bid to the pawnee.

According to a preferred embodiment, said step (c) selecting one of the at least one bid as said winning bid and the bidder of the winning bid as said pawnee comprises:

(c1*a*) providing to the pawner a notification of said at least one bid, and (c1*b*) receiving from the pawner a selection of said winning bid.

According to an alternative embodiment, said step (c) selecting one of the at least one bid as said winning bid and the bidder of the winning bid as said pawnee comprises:

(c2) automatically selecting the highest of said at least one bid as said winning bid.

In a preferred embodiment, said step (a) receiving from a pawner an indication of an item to be pawned comprises the steps of:

(a1) providing to the pawner access to a goods database, and (a2) receiving from the pawner a selection of an item identification from the goods database.

The selected item identification may, in particular, be part of the indication of the item entered into a database.

According to a preferred embodiment, said step (a) receiving from a pawner an indication of an item to be pawned further comprises receiving from the pawner at least one of an item description, a minimum bid, a location of the item, a condition of the item, a picture of the item, a bidding time, delivery time, a release time, and a selection of said custodian.

In a preferred embodiment, the item is a vehicle and, in particular, a car. In particular, the custodian may, moreover, be a car dealer or a car repair shop.

In a preferred embodiment, the method further comprises the step:

(a3) receiving from the pawner a selection of said custodian.

In another embodiment, the method further comprises the step:

(b1) receiving from the bidder a selection of a proposal for said custodian.

In a preferred embodiment, the custodian may be selected from a group of at least two branch establishments and/or cooperation partners with distinct addresses. Here, a custodian address may further be selected by the pawner or may be proposed by the bidders. Here, the pawner may select a custodian with an address nearby. He may thus not be required to bring or send the pawned item over long distances. Alternatively, the pawner may also decide to deliver the pawned item to a custodian with an address further away from his place, such that he avoids the pawned item to be seen by his neighbours which might potentially cause embarrassment.

In a preferred embodiment, at least one of said method steps is via the Internet.

In a third aspect, an embodiment of the present invention provides a computer-readable medium containing instructions that when executed by a computer cause the computer to: provide an offering user interface to a pawner to enter an indication of an item, provide a bidding user interface to at least one bidder to enter at least one bid, and provide a release user interface to a trustee and/or to a custodian to enter a release remark.

According to a preferred embodiment, the bidding user interface is only provided within a predetermined bidding time after the indication of said item has been entered, and the release user interface is only provided within a predetermined release time.

Moreover, it is well within the scope and spirit of the present invention that the described system, method, and medium may be applied to selling an item and reserving a right of repurchase of the item. Here, the term pawner may refer to a seller, while the term pawnee may refer to a buyer.

Further, the term item may refer to any tangible or intangible asset. In particular, the item may be a deed, a title deed, a certificate, or any other document conferring any type of rights.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
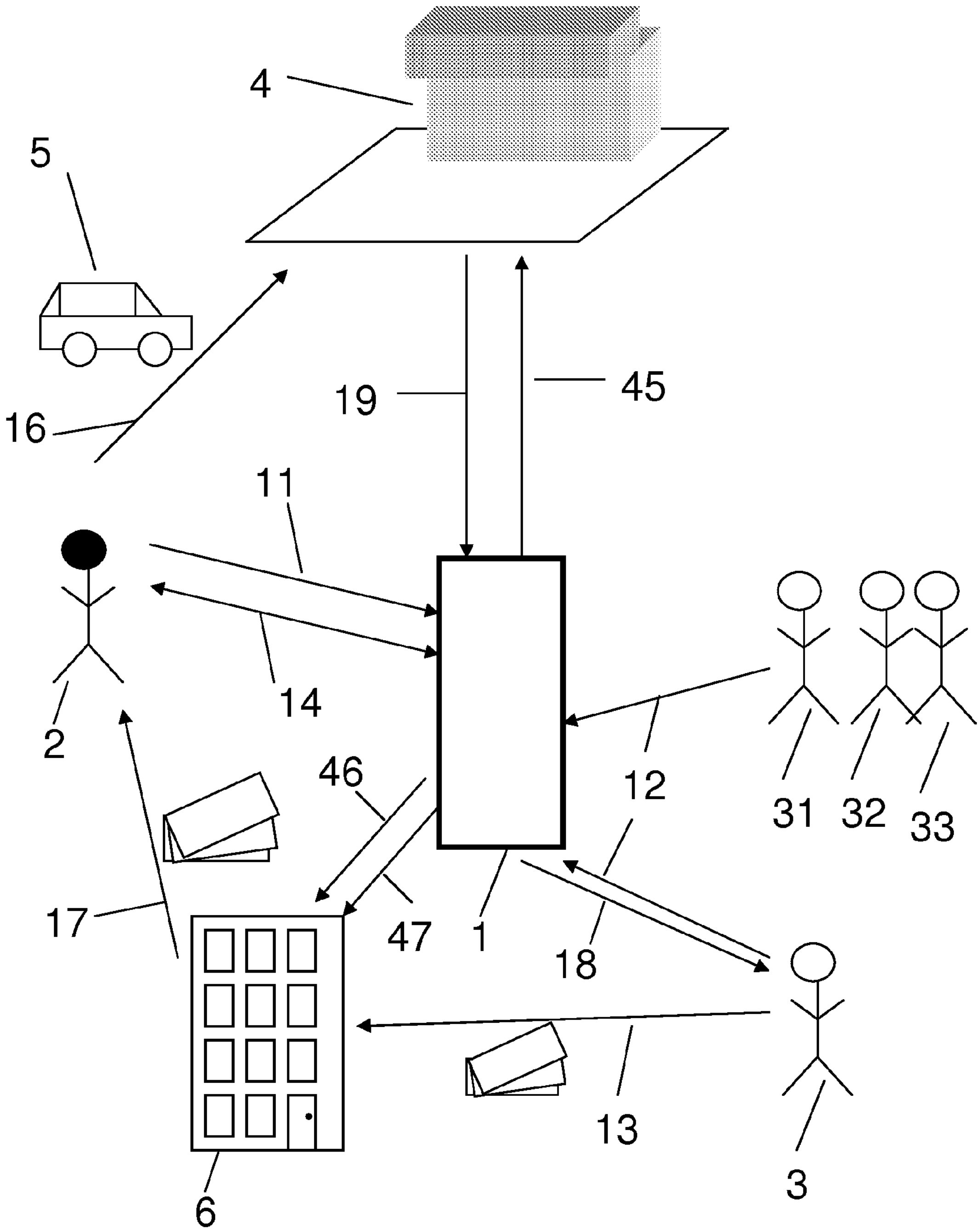
FIG. 1 is a schematic drawing of method steps according to an embodiment of the present invention.

FIG. 1 schematically shows method steps that are comprised in a first phase of a method according to an embodiment of the present invention. The method is best illustrated by the interactions between pawner 2, system 1, bidders 3, 31, 32, 33, trustee 6, and custodian 4.

In a first step 11, the pawner 2 enters an indication of an item 5 to be pawned into system 1. In some embodiments (not shown in FIG. 1), the pawner may further be requested by the system to transfer payment of a pawner fee to the trustee. The pawner fee may be dependent on a length of an item description, a number of pictures, etc., entered by the pawner via the offering user interface. For the indication of the item to be activated and visible for bidders, it may be further required that the trustee confirms receipt of said pawner fee payment and enters a pawner fee receipt remark in the system.

Returning to FIG. 1, after the pawner 2 entered the indication into the system 1, a bidding phase starts. For a predetermined bidding time, bidders 3, 31, 32, 33 are allowed to enter 12 their bids on the indication into the system 1. After the bidding time elapses, one of the entered bids is selected as a winning bid and the bidder of the winning bid—indicated by reference numeral 3—as a pawnee. In the embodiment of FIG. 1, the step of selecting a winning bid comprises an interaction 14 between the system 1 and the pawner 2 in which the system 1 provides a notification of the bids to the pawner 2 and pawner 2, in turn, enters his or her selection of the winning bid into the system 1.

After having been selected, bidder 3 is notified 18 that he or she is the pawnee and, moreover, the bidder 3 is notified to transfer the winning bid. Simultaneously, the system 1 notifies 45, 46 the custodian 4 and the trustee 6 that a pawnee was selected. The pawner—in the following labelled by reference numeral 3—then transfers 13 payment of the winning bid to the trustee 6. The pawner 2, moreover, delivers 16 the item 5, which in FIG. 1 is depicted by a car to the custodian 4, which is here depicted as a car dealer. However, a car is only given as an example of an item to be pawned. The custodian then enters 19 a delivery remark into the system 1. The system 1 then notifies 47 the trustee that the item 5 was delivered to the custodian 4. Upon receipt of the notification 47, the trustee 6 transfers 17 payment of the winning bid to the pawner 2.

Figure 2A:
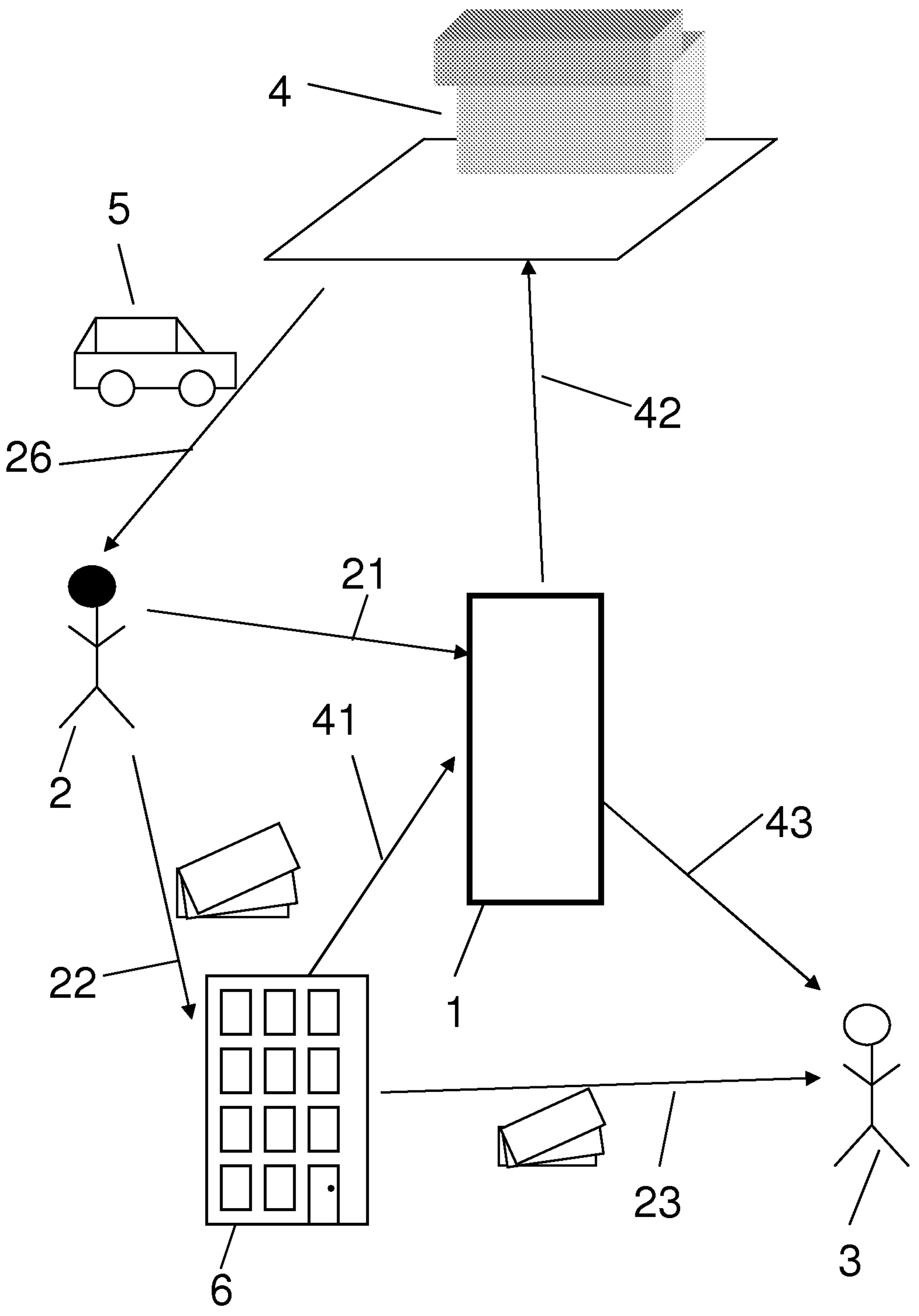
FIG. 2A is a schematic drawing of method steps for the case that the pawned item is released according to an embodiment of the present invention.

Upon selection of the winning bid and the pawner, a release time period begins, during which the pawner is allowed to ask for release of the item. FIG. 2A shows the corresponding method steps if the pawner decides to ask for release, while FIG. 2B shows the corresponding method steps if the pawner does not ask for a release within the release time period.

In FIG. 2A, the pawner 2 enters 21 a release request into the system 1. Moreover, the pawner 2 transfers 22 a release payment to the trustee 6. The release payment comprises an amount equivalent to the winning bid plus interest and a release fee.

The trustee then enters 41 a release remark into the system 1. The system 1 subsequently notifies 42 the custodian 4 that the item 5 was released. Custodian 4 then gives back 26 the item 5 to the pawner 2. Moreover, the system 1 notifies 43 the pawnee 3 that the item 5 was released and trustee 6 transfers 23 payment of the winning bid plus interest to the pawnee 3.

Figure 2B:
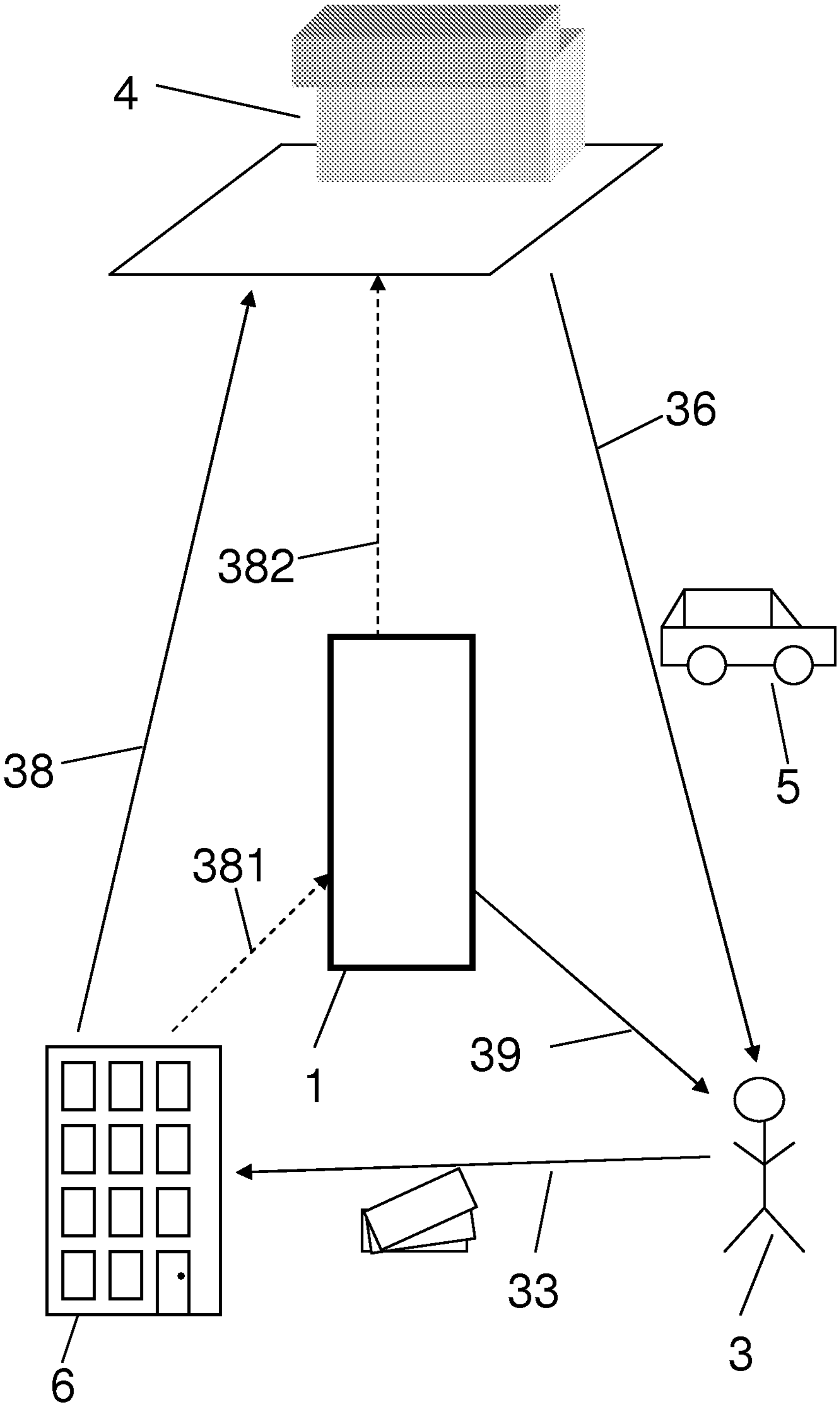
FIG. 2B is a schematic drawing of method steps for the case that the pawned item is not released according to an embodiment of the present invention.

FIG. 2B schematically shows the procedure if the pawner 2 does not ask for a release of the item 5 within the release time. After the release time expires, the system 1 notifies 39 the pawnee 3 that the item 5 was not released by the pawner and that he or she is to pay a pawnee fee to the trustee 6. The pawnee 3 transfers 33 payment of the pawnee fee to the trustee 6 who then notifies 38 the custodian 4 to hand over 36 the item 5 to the pawnee 3. The notification of the custodian 4 may either be directly by the trustee 4. Alternatively, this may comprise the trustee entering 381 a pawnee fee receipt notification into the system 1 and the system 1 notifying 382 the custodian 4 that the pawnee fee has been paid (see dashed lines in FIG. 2B).

Figure 3:
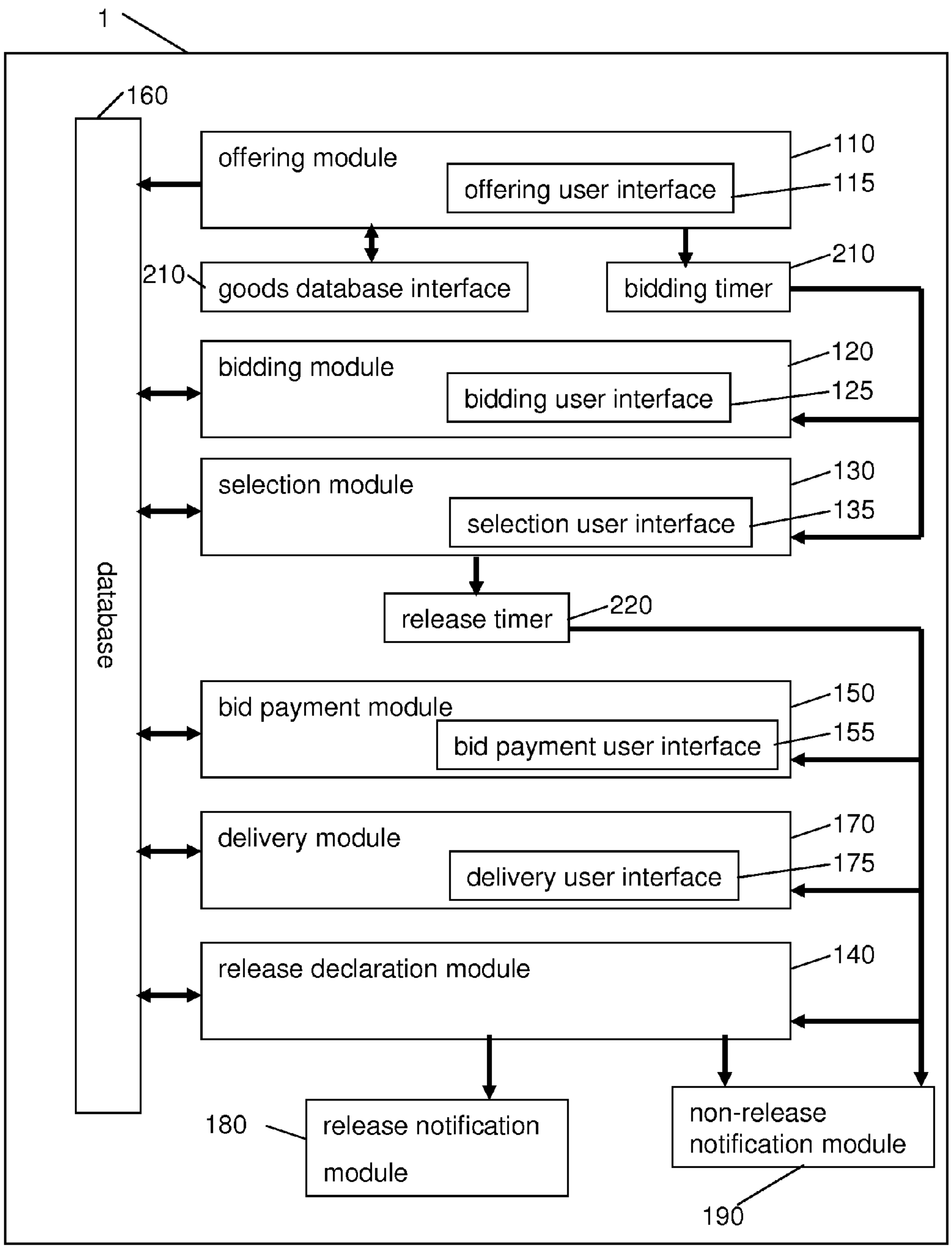
FIG. 3 is a schematic drawing of a system according to an embodiment of the present invention.

FIG. 3 shows a system 1 in accordance with an embodiment of the present invention. The system 1 comprises a database 160. Moreover, the system 1 comprises an offering module 110 with an offering user interface 115. The offering module allows the pawner 2 to enter an indication of an item 5 to be pawned into the database 160. To facilitate entering of the indication, the system 1 further comprises a goods database interface 210 to connect to a goods database located at an external supplier. The goods database may, in particular, comprise a list of various items from which the pawner 2 is allowed to select an item via the offering user interface 115.

Figure 7:
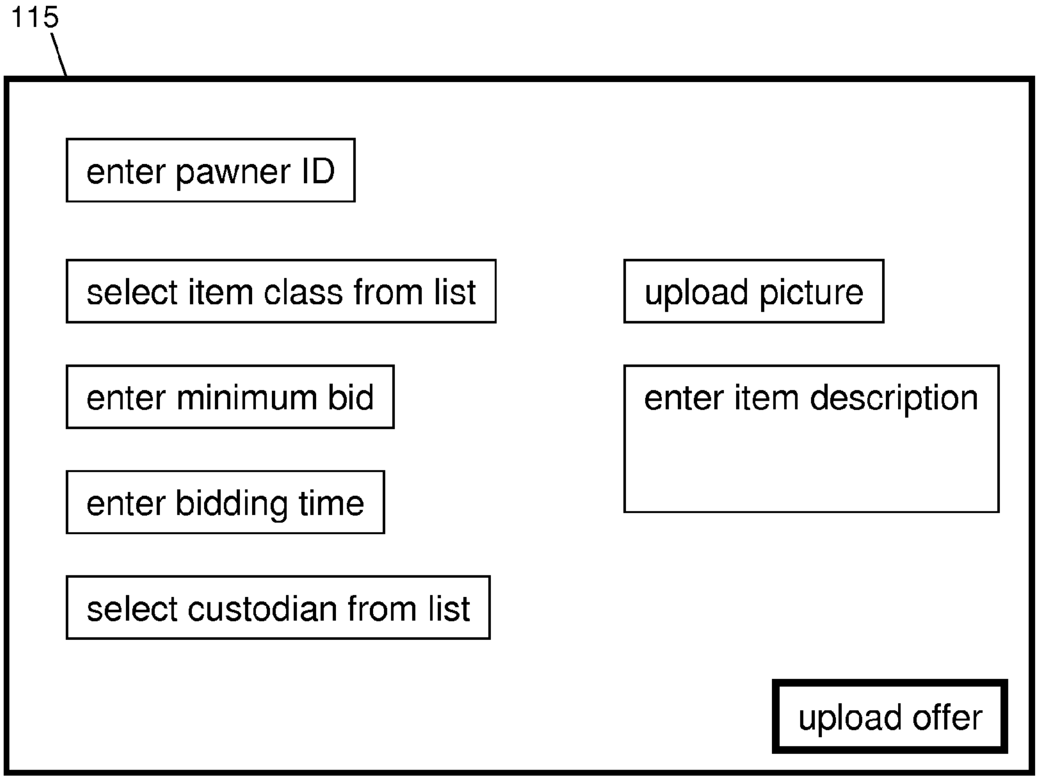
FIG. 7 shows a schematic drawing of an offering user interface according to an embodiment of the present invention.

Moreover, FIG. 7 shows a schematic drawing of an offering user interface 115. The offering user interface allows the pawner to enter his ID. This may further require the pawner to enter an identification and some authentication information like, for example, a password. Moreover, the offering user interface 115 allows the pawner to select an item class from a list. The item class may refer to different classes of goods like, for example, different types of vehicles. Moreover, the offering user interface 115 allows the pawner to enter a minimum bid. Subsequent bids by bidders may in some embodiments only be considered if they are higher than the minimum bid entered by the pawner 2. Moreover, the pawner 2 is allowed to enter a bidding time during which bidders may enter their bids. In some embodiments, the offering user interface may further allow the pawner to enter a later starting point for the bidding time period than the time at which the indication of the item is entered into the system.

The offering user interface 115, moreover, allows the pawner 2 to select a custodian from a list. Here, custodians with distinct addresses may be provided to which the pawned item 5 may be delivered. In some embodiments, the distinct custodian addresses may refer to different branch establishments and/or cooperation partners with distinct addresses. Further, the offering user interface 115 allows the pawner 2 to upload one or more pictures into the database 160. Moreover, the offering user interface 115 provides a possibility to enter an item description into the database 160. This may comprise a free text field that the pawner may fill in. After the pawner 2 filled in the required fields of the offering user interface 115, the pawner 2 may upload the offer which is then stored in the database 160. While FIG. 7 shows an explicit offering user interface according to an embodiment of the present invention, other forms and shapes are to be understood to be within the scope of the present invention. For example, the offering user interface 115 may comprise several screens with fields for the pawner 2 to fill in.

Returning now to FIG. 3, the system 1 further comprises a bidding timer 210, which in some embodiments may start when the indication of the item has been entered into the database 160. In other embodiments, the pawner 2 may be allowed to chose a later starting time for the bidding timer as set forth above. After the bidding timer 210 has been started, a bidding module 120 comprising a bidding user interface 125 is activated. The bidding user interface 125 is available to potential bidders to review the indication of the item 5 in the database 160. Moreover, the bidding user interface 125 allows the bidders to enter their bids. In some embodiments, the bidding user interface 125 may require the bidders to enter their identifications. Moreover, in some embodiments, the bidders may be required to enter an authentication. The bidding user interface 125 may further allow the bidders to enter a proposed release time, delivery time, etc.

After elapse of the bidding time on the bidding timer 210, selection module 130 with selection user interface 135 is activated. Selection module 130 may notify the pawner 2 of the elapse of the bidding time and may make the selection user interface 135 available to the pawner 2. Using the selection user interface 135, the pawner 2 may browse a list of the entered bids and may select one of the bids as the winning bid and the bidder of the winning bid is selected as the pawnee.

The system 1 of FIG. 3 further comprises a release timer 220 which starts when the winning bid is selected by means of the selection module 130. The release timer 220 runs for a release time which may be a predetermined value stored in the system 1, may be determined by the pawner 2 or may be proposed by the bidder using the bidding user interface 125. In the embodiment of FIG. 3, the system 1 further comprises a bid payment module 150 with a bid payment user interface 155 available to the pawnee 3. The bid payment module allows the pawnee 3 to transfer payment of the winning bid to the trustee. Moreover, the system 1 comprises a delivery module 170 with a delivery user interface that is available to the custodian 4. Using the delivery user interface 175, the custodian 4 may enter a delivery remark into the database 160 when the item 5 was delivered to the custodian 4.

Moreover, the system 1 comprises a release declaration module 140 and a release notification module 180. If the release declaration module 140 receives a release remark from the trustee within the release time, the release notification module 180 notifies the pawnee 3 that the item was released.

In some embodiments, the system may further comprise a release request module for the pawner to enter a release request, wherein the release request module is adapted to forward the received release request to the trustee.

The system 1 of FIG. 3 further comprises a non-release notification module 190. The non-release notification module 190 notifies the pawnee 3 and the custodian 4 that the item 5 was not released. The pawnee 3 is prompted to transfer payment of a pawnee fee while the custodian 4 is prompted to hand over the item 5 to the pawnee 3. Optionally, the non-release notification module 190 may also notify the trustee 6 that the item 5 was not released within the release time.

Modifications of the system according to FIG. 3 are possible and within the scope of the present invention. In particular, the system may comprise that the release timer is started when the winning bid was transferred by the pawnee and/or a bid payment remark is received from the trustee.

Figure 4:
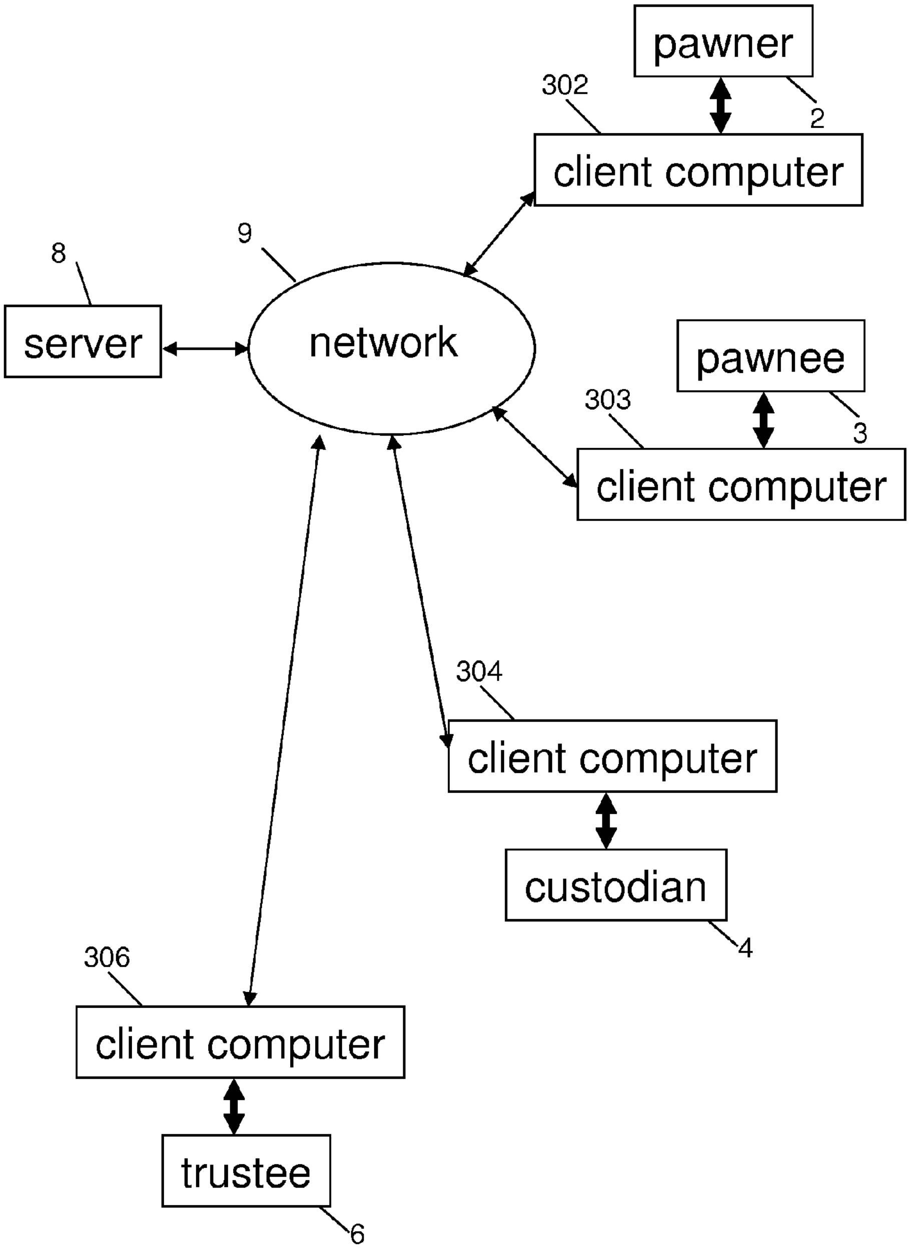
FIG. 4 is a block diagram illustrating an example arrangement in which the pawner, the pawnee, and the custodian communicate with a server.

FIG. 4 shows an example arrangement in which one or more embodiments of the present invention may be practiced. The arrangement comprises a server 8 which is in bi-directional communication with a network 9 to which a number of client computers is connected. In particular, network 9 is connected to a client computer 302 which is operated by the pawner 2. Network 9 is further connected with a client computer 303 operated by the pawnee 3 and, moreover, network 9 is connected to a client computer 304 which is operated by the custodian 4. Moreover, network 9 is connected to a client computer 306 operated by the trustee 6. In this arrangement, in particular the user interfaces may be directed from the server 8 via the network 9 to the respective client computer 302, 303, 304, 306. The server 8 may further be adapted to comprise the database, portions of the modules, and timers of the system 1. All connections shown in FIG. 4 may, moreover, be adapted for a bidirectional communication.

Figure 5:
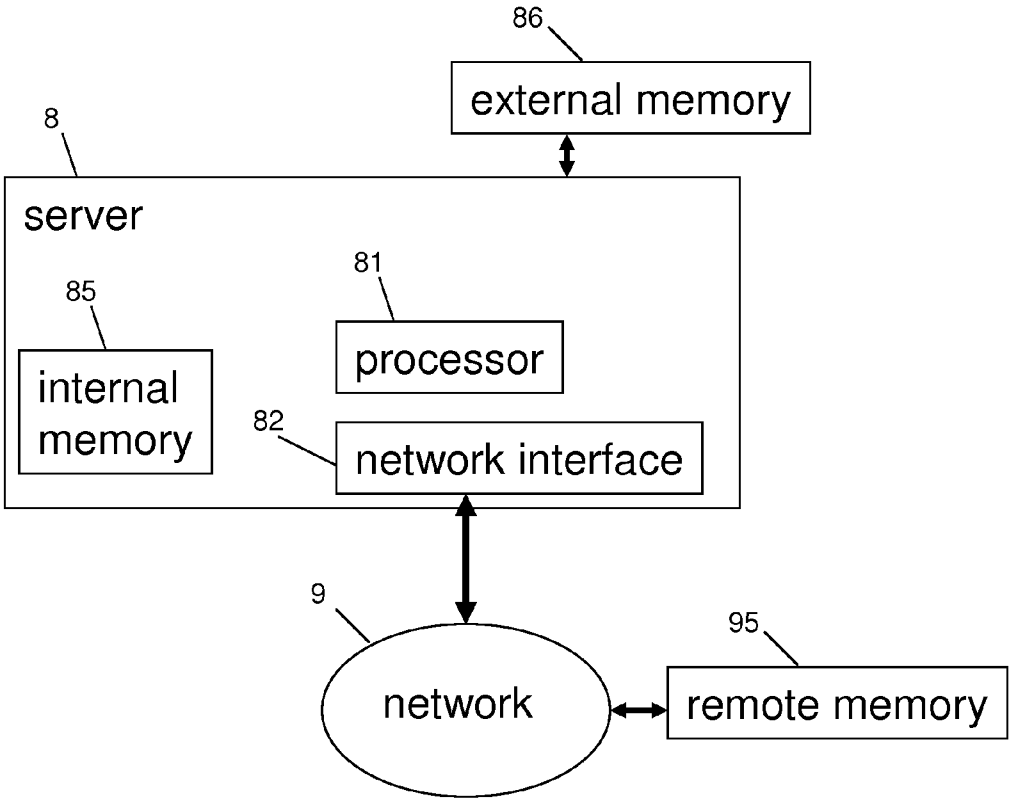
FIG. 5 is a block diagram illustrating an example server adapted to be used with the system of an embodiment of the present invention.

FIG. 5 illustrates an example server 8 adapted to be used with the present invention. Server 8 comprises a processor 81. Moreover, server 8 has a network interface 82 which is adapted to connect to network 9. Moreover, server 8 may be provided with a number of memories. As shown in FIG. 5, server 8 may comprise an internal memory 85 and may be connected with an external memory 86. Additionally, server 8 may be coupled to a remote memory 95 via network 9. In some embodiments, the database may be stored in the internal memory 85, the external memory 86, and/or the remote memory 95.

Figure 6A:
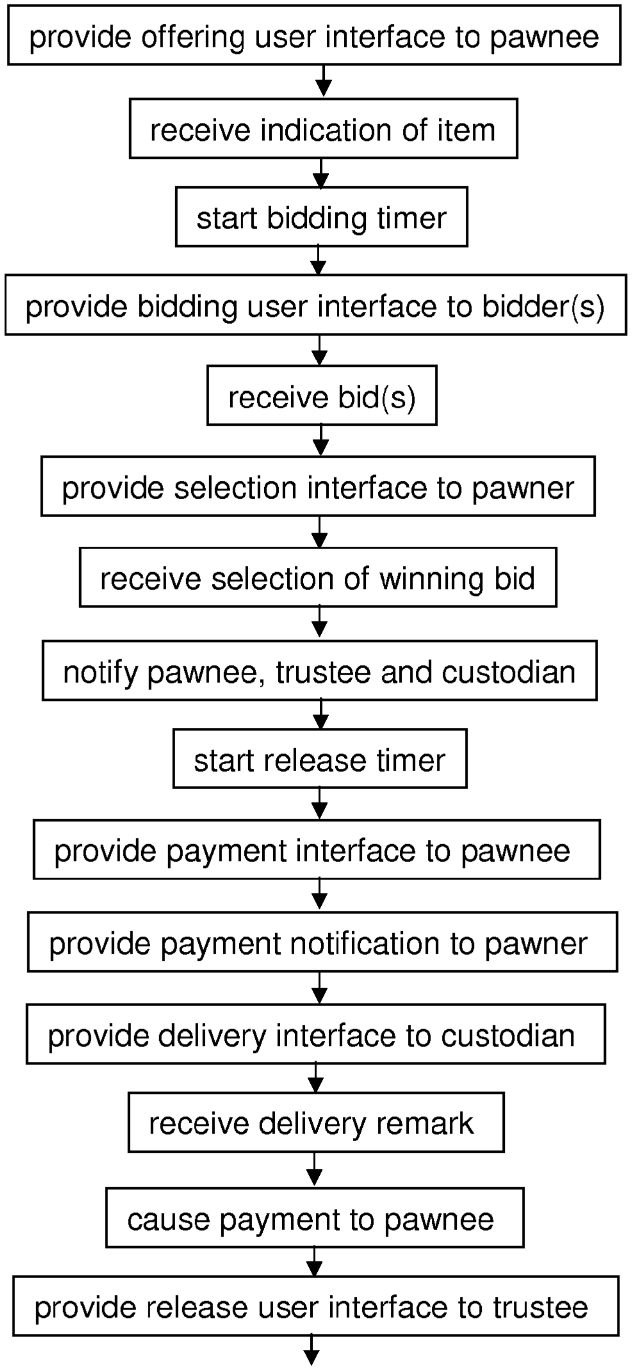
FIGS. 6A and 6B show a flow chart of the method according to an embodiment of the present invention.
Figure 6B:
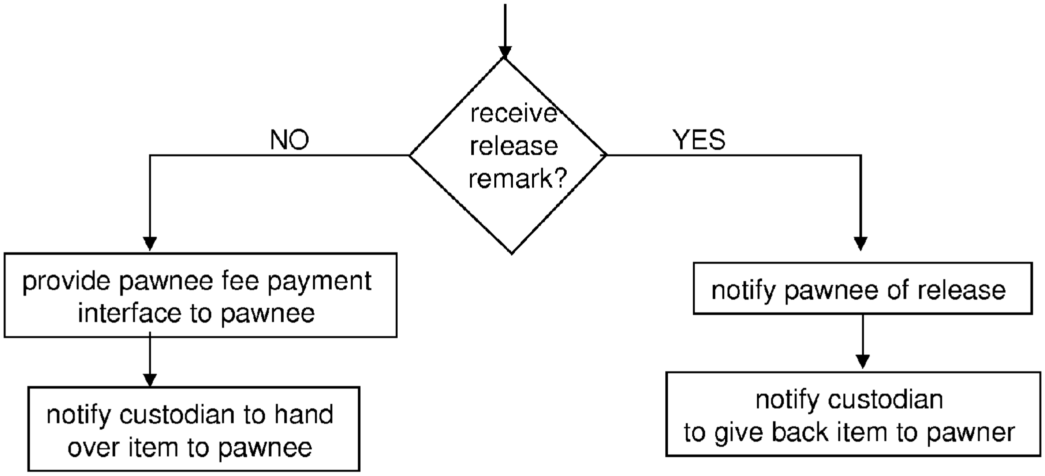

FIGS. 6A and 6B show a flow chart of the method according to an embodiment of the present invention. According to the illustrated method, an offering user interface is provided by the system to the pawnee. Next, an indication of an item is received by the system from the pawnee. The system then starts the bidding timer and, within the bidding time, provides a bidding user interface to bidders. The system receives at least one bid from the bidder. Upon elapse of the bidding time, the system provides a selection interface to the pawner and receives a selection of the winning bid from the pawner. The system then notifies the pawnee, the trustee, and the custodian.

The system then starts the release timer and provides a bid payment interface to the pawnee. When the pawnee completes transfer of the winning bid, the system provides a payment notification to the pawner and, further, provides a delivery interface to the custodian.

If the system receives a delivery remark from the custodian, it causes payment of the winning bid from the trustee to the pawnee. This payment may comprise an amount equivalent to the winning bid. In some embodiments, this amount may be decimated by some charges to be paid to the trustee and/or to the custodian. In case the system does not receive a delivery remark from the custodian within a predetermined delivery time (not shown in FIG. 6A), the system may notify the pawnee that the item was not delivered to the custodian within the predetermined delivery time and, moreover, cause retransfer of said winning bid as set forth above.

Next, in the method to FIG. 6A, a release user interface is provided by the system to the trustee. Proceeding to FIG. 6B, the further procedure of the method depends on whether the system receives from the trustee a release remark within the predetermined release time. If the system receives a release remark by the trustee within the release time, the system notifies the pawnee of the release and further notifies the custodian to give back the item to the pawner.

If the system does not receive a release remark within the predetermined release time, the system provides a pawnee fee payment interface to the pawnee. Upon completion of pawnee fee payment, the system notifies the custodian to hand over the item to the pawnee.

The foregoing description of embodiments of the invention have been presented for purposes of illustration and description. It is not extended to be exhaustive or to limit the invention to the precise form disclosed. Modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. Having described aspects in detail, it will be apparent that modifications and variations are possible without departing from the scope of aspects as defined in the appended claims as various changes could be made in the above constructions, products and methods without parting from the scope of aspects. It is intended that all matter contained in the above description and shown in the accompanying drawings shall be interpreted as illustrative and not in a limiting sense.

The embodiments of the invention in which an exclusive property or privilege is claimed are defined as follows:

1. A computer system comprising one or more processors and computer-readable storage media having stored therein computer-executable instructions configured to cause the computer system to implement the following:

a database;

an offering module comprising an offering user interface for a pawner to enter an indication of an item to be pawned into the database;

a bidding module comprising a bidding user interface for at least one bidder to enter at least one bid into the database;

a selection module configured to select one of the at least one bid as a winning bid and the bidder of the winning bid as a pawnee;

a release declaration module configured to declare a release of the item if the release declaration module receives a release remark; and a release notification module configured to notify the pawnee that the item was released if the release declaration module declares a release of the item.

2. The computer system of claim 1, wherein the computer-executable instructions are further configured to cause the computer system to implement a bidding timer to determine if a predetermined bidding time has elapsed since the indication was entered into the database, wherein the bidding module only allows a bid to be entered if the predetermined bidding time has not elapsed.

3. The computer system of claim 1, wherein the computer-executable instructions are further configured to cause the computer system to implement a release timer to determine if a predetermined release time has elapsed since the indication was entered into the database or since said at least one bid was selected as the winning bid, wherein the release declaration module only declares said release of the item if the release declaration module receives a release remark within the predetermined release time.

4. The computer system of claim 3, wherein the computer-executable instructions are further configured to cause the computer system to implement a non-release notification module configured to notify a custodian to hand over the item to the pawnee after elapse of the release time if the release declaration module has not declared said release of the item.

5. The computer system of claim 1, wherein the computer-executable instructions are further configured to cause the computer system to implement a bid payment module for the pawnee to transfer payment of said winning bid.

6. The computer system of claim 1, wherein the computer-executable instructions are further configured to cause the computer system to implement a release payment module for the pawner to transfer a release payment.

7. The computer system of claim 1, wherein the computer-executable instructions are further configured to cause the computer system to implement a delivery module comprising a delivery user interface for a custodian to enter a delivery remark into the database if the item was delivered to the custodian.

8. The computer system of claim 1, wherein at least one of the user interfaces is available via the Internet.

9. The computer system of claim 1, wherein the offering module is configured to allow the pawner to select an existing indication of an item in a goods database.

10. A computer-implemented method comprising:

(a) by a server computer, receiving from a pawner an indication of an item to be pawned;

(b) by the server computer, receiving from at least one bidder at least one bid;

(c) by the server computer, selecting one of the at least one bid as a winning bid and the bidder of the winning bid as a pawnee;

(d) by the server computer, notifying the pawnee to transfer payment of said winning bid to a trustee;

(e) by the server computer, notifying the pawnee whether the item was delivered to a custodian;

(f1) if a release remark is received before elapse of a predetermined release time:

(f1*a*) by the server computer, notifying the pawnee that the item was released, and (f1*b*) by the server computer, causing transfer of payment of winning bid and interest to the pawnee;

(f2) if no release remark is received before elapse of the predetermined release time:

(f2*a*) by the server computer, notifying the pawnee that the item was not released, and (f2*b*) by the server computer, notifying the custodian to hand over the item to the pawnee.

11. The method of claim 10, wherein said step (e) notifying the pawnee whether the item was delivered to said custodian is based on the following steps:

(e1) if a delivery remark was received from the custodian within a predetermined delivery time:

notifying the pawnee that the item was delivered to the custodian;

(e2) if a delivery remark was not received within said predetermined delivery time:

(e2*a*) notifying the pawnee that the item was not delivered to the custodian within the predetermined delivery time, and (e2*b*) causing retransfer of payment of said winning bid to the pawnee.

12. The method of claim 10, wherein said step (c) selecting one of the at least one bid as said winning bid and the bidder of the winning bid as said pawnee, comprises:

(c1*a*) providing to the pawner a notification of said at least one bid, and (c1*b*) receiving from the pawner a selection of said winning bid.

13. The method of claim 10, wherein said step (c) selecting one of the at least one bid as said winning bid and the bidder of the winning bid as said pawnee, comprises:

(c2) automatically selecting the highest of said at least one bid as said winning bid and the bidder of said winning bid as said pawnee.

14. The method of claim 10, wherein said step (a) receiving from a pawner an indication of an item to be pawned comprises the steps of:

(a1) providing to the pawner access to a goods database, and (a2) receiving from the pawner a selection of an item from the goods database.

15. The method of claim 10, wherein said step (a) receiving from a pawner an indication of an item to be pawned further comprises receiving from the pawner at least one of an item description, a minimum bid, a location of the item, a condition of the item, a picture of the item, a bidding time, delivery time, a release time, and a selection of said custodian.

16. The method of claim 10, wherein the item is a vehicle and, in particular, a car.

17. The method of claim 10, further comprising the step of:

(a3) by the server computer, receiving from the pawner a selection of said custodian.

18. The method of claim 10, wherein at least one of said steps is performed via the Internet.

19. A non-transitory computer-readable medium containing instructions that when executed by a computer cause the computer to:

provide an offering user interface to a pawner to enter an indication of an item;

provide a bidding user interface to at least one bidder to enter at least one bid; and provide a release user interface to a trustee to enter a release remark;

wherein the bidding user interface is only provided within a predetermined bidding time after the indication of an item has been entered, and wherein the release user interface is only provided within a predetermined release time.

* * * * *